United States Patent [19]

Harrer

[11] 4,241,849
[45] Dec. 30, 1980

[54] AIR CUT-OFF PAD FOR AN AIR PLANTER WITH SEED DISCHARGE FEATURE

[75] Inventor: Paul H. Harrer, La Porte, Ind.
[73] Assignee: Allis-Chalmers Corporation, Milwaukee, Wis.
[21] Appl. No.: 36,667
[22] Filed: May 7, 1979
[51] Int. Cl.³ .............................................. A01C 7/04
[52] U.S. Cl. .................... 221/266; 111/77; 221/278
[58] Field of Search ............... 221/211, 266, 278; 111/77, 78

[56] References Cited

U.S. PATENT DOCUMENTS

| | | | |
|---|---|---|---|
| 2,667,286 | 1/1954 | Raught | 221/266 X |
| 3,048,132 | 8/1962 | Morgan et al. | 221/266 X |
| 4,074,830 | 2/1978 | Adams et al. | 221/266 |
| 4,091,964 | 5/1978 | Harrer | 221/266 |

*Primary Examiner*—F. J. Bartuska
*Attorney, Agent, or Firm*—Charles L. Schwab

[57] ABSTRACT

A resilient air cut-off pad 52 for an air planter is provided with an area of gradually decreasing thickness in the form of a seed discharge ramp 66 which has a rounded bottom 68 aligned with the circular path of the circumferentially spaced seed pockets 47 on the seed singulating disk 33. The seeds in the pockets 47 are relieved of pressure from the resilient pad 52 by their registration with the ramp 66 as they approach the trailing edge 54 of the pad 52. This insures that the seeds drop by gravity at uniform spacing without resilient thrust being imparted thereto by the trailing edge.

3 Claims, 3 Drawing Figures

AIR CUT-OFF PAD FOR AN AIR PLANTER WITH SEED DISCHARGE FEATURE

This invention relates to an air planter of the type having a housing in which a vertically disposed seed singulating disk rotates, and more particularly to the provision of a special seed discharge ramp on a resilient air cut-off pad.

BACKGROUND OF THE INVENTION

Air planters in which the present invention has particular utility are shown in earlier issued patents U.S. Pat. No. 4,074,830 and 4,091,964. In both of these prior art constructions, a resilient air cut-off pad seals the pressurized cavity in which seeds are held for singulating pick-up by the rotating disk and serves as a wall to hold the seeds in circumferentially spaced pockets as the disk rotates to sequentially bring the pockets to the lower drop portion of the planter housing. It has been found that as the seeds pass over the trailing edge of the resilient air cut-off pad at the drop portion of the housing, some may have pressure contact with the pad which will cause them to flip and not drop in a regular pattern, thus producing irregular spacing of the seeds. The present invention is directed to solving this problem.

SUMMARY OF THE INVENTION

The present invention has utility in an air planter of the type having a main housing with a seed cavity to which bulk seed and pressurized air are supplied and a seed drop portion at the lower part thereof, together with a vertical seed singulating disk rotatable about a horizontal axis having a generally flat sealing face in which circumferentially spaced seed pockets are formed so as to sequentially communicate, during rotation of the disk, with the seed cavity and the seed drop portion. A resilient air cut-off pad is interposed between the housing and the disk and presents a trailing edge adjacent the seed drop portion of the housing. The resilient pad has a generally flat sealing surface in sealing engagement with the flat face of the disk and an area adjacent its trailing edge which is of gradually decreasing thickness in the direction of rotation of the disk. As the disk pockets are rotated into confronting relation with the area of gradually decreasing thickness of the air cut-off pad, the seeds in the pockets will be relieved of resilient pressure caused by contact with the pad and be free to fall by gravity from the pocket, as the pocket is rotated past the trailing edge of the pad.

The area of decreasing thickness may be a groove or ramp of gradually increasing width and depth as it extends a predetermined distance to the trailing edge of the pad. The ramp may be defined by a pair of sloping sidewalls converging in a rounded bottom which registers with the circular path of the pockets.

BRIEF DESCRIPTION OF THE DRAWINGS

The present invention is incorporated in an air planter shown in the drawings in which.

DETAILED DESCRIPTION OF THE DRAWINGS

Figure 1:
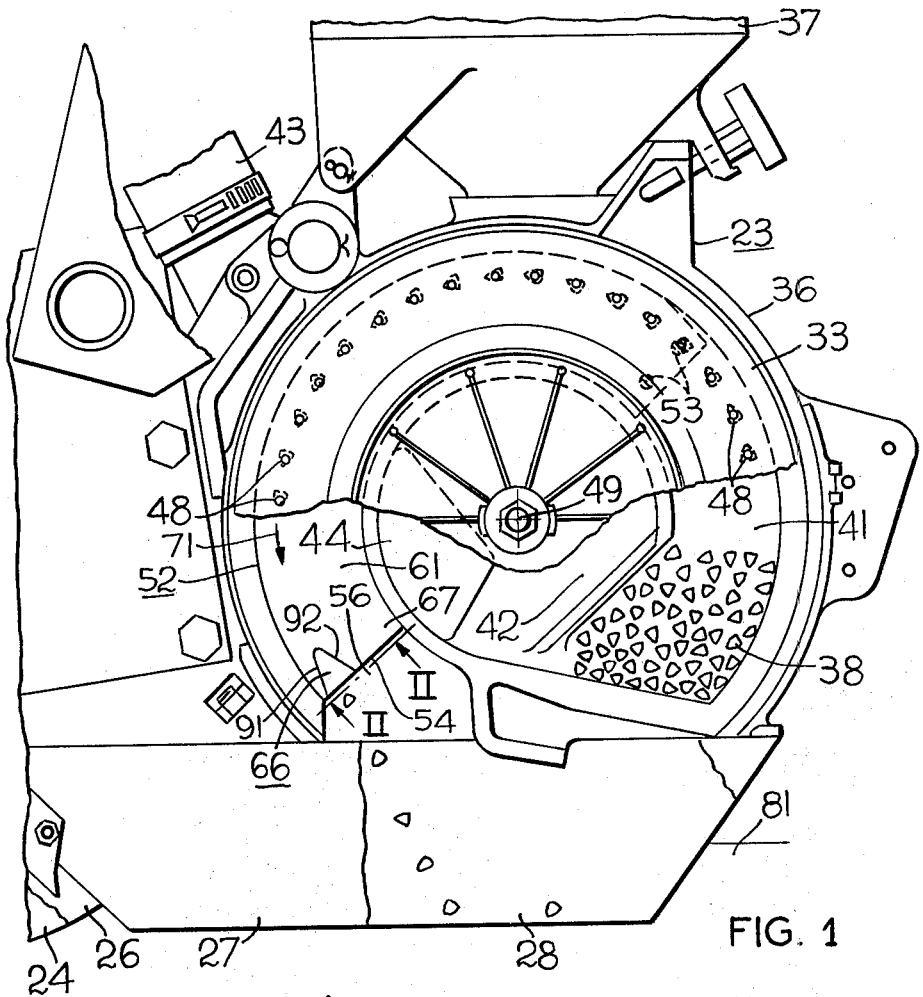
FIG. 1 is a side view of an air planter with certain parts broken away for illustration purposes.

Referring to FIG. 1, a single row planter unit 23, which is similar to the planter units shown in U.S. Pat. Nos. 4,074,830 and 4,091,964, includes a pair of furrow opening disks 24, 26, only portions of which are shown, and a pair of transversely spaced, longitudinally extending runners or shoes 27, 28. The shoes have their longitudinally central portions disposed on opposite sides of a vertical seed singulating disk 33 and converge at their front ends which carry scrapers for the inner, confronting sides of the disks 24, 26. The planter unit includes a housing 36 and a seed hopper 37. Seed 38 is supplied by gravity from the hopper 37 to a cavity 41 of the housing 36 by way of a passageway 42. A blower (not shown) supplies pressurized air to the cavity 41 of the housing 36 by way of a conduit 43 and passageway 44.

Figure 2:
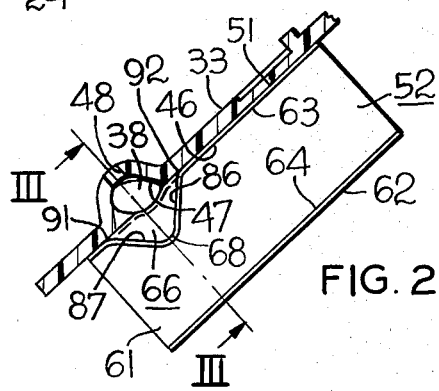
FIG. 2 is a section taken along the lines II—II in FIG. 1.
Figure 3:
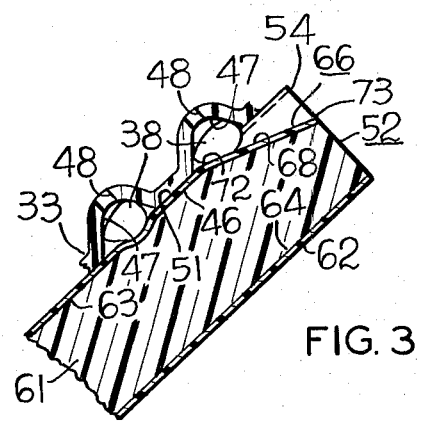
FIG. 3 is a section view taken along the lines III—III in FIG. 2.

The disk 33, which is similar to the disks described in U.S. Pat. Nos. 4,074,830 and 4,091,906, is constructed of a relatively stiff, flexible plastic material and serves as one sidewall of the seed cavity 41. Referring also to FIGS. 2 and 3, the disk 33 has a relatively flat sealing face 46 in which circumferentially spaced pockets 47 are formed. Each pocket has an opening or air vent 48 through which pressurized air will flow. As the disk is rotated in a counterclockwise direction, as viewed in FIG. 1, about its horizontal, transverse axis 49, seed will be induced to move into the pockets by the flow of air through the vents 48 as the pockets pass the seed cavity 41. Continued rotational movement will bring the pockets into confronting relationship with a flat sealing surface 51 of a resilient air cut-off pad 52 of predetermined thickness in a direction parallel to the axis 49 of the seed disk. The pad 52 is arcuate in shape and has a radial width sufficient to accommodate disks having plural annular rows of pockets on different diameters. The leading edge of the pad 52 is secured by a pair of screws 53 and the pad extends approximately in a 180-degree arc to its trailing edge 54 adjacent the seed drop portion 56 of the housing 36. As more fully described in U.S. Pat. Nos. 4,091,964 and 4,074,830, the body 61 of the air cut-off pad 52 is made of a resilient plastic foam material, and the flat sealing surface 51 and flat backing surface 62 are provided by relatively stiff plastic sheet segments 63, 64 which are bonded to opposite sides of the resilient body 61.

An area of gradually decreasing thickness in the pad in the form of a seed discharge groove or ramp 66 is formed on the trailing end 67 of the air discharge pad 52. The ramp 66 confronts the seed pockets 47 with the central part 68 of the ramp 66 in registration with the pockets as they move on their circular path, in the direction of arrow 71, to the trailing edge of 54 of the pad 52. As shown in FIG. 3, the central part is a rounded bottom 68 of the ramp 66 which slopes gradually away from the face 46 of the disk 33 from its beginning at point 72 on the sealing surface 51 of the pad 52 to its end at point 73 at the trailing edge 54 of the pad. Since the central part 68 of the ramp 66 slopes gradually away from the sealing face 46 of the disk 33 in the direction toward the trailing edge 54 of the pad 52, the seeds 38 in the pockets will gradually be relieved of any pressure exerted against them by the sealing surface 51 of resilient pad 52. By the time the pocket 47 has moved in its circular path to the trailing edge 54 of the pad 52, the seed therein will be relieved of all pressure from the resilient pad and be free to fall by gravity to the bottom of the furrow 81 formed by disks 24, 26 and held open for the seed drop by shoes 27, 28.

The illustrated disk 33 is for planting corn, and the pockets 47 are sized to hold no more than one kernel each. However, kernels of corn are not all the same shape or size and some may not lie flat in the pocket. Thus, some kernels will project out of the pockets and bear against the resilient pad 52. When using a resilient pad of prior art construction, the projecting kernel was suddenly relieved of the pressure of the pad when it passed over its trailing edge. The return of the trailing edge to its normal configuration as the seed passed over it imparted thrust to the kernel and caused its trajectory to be different from that of a seed which did not project from its pocket and simply fell by gravity. Thus, the seed kernels which were subjected to pressure from the pad at the time they passed across the trailing edge of the pad were almost certain to deposit in the furrow at irregular spacings, whereas kernels falling by gravity without biasing pressure from the resilient pad tended to be deposited at regular (uniform) spacing. The present invention, in effect, insures that each kernel of seed is free to fall by gravity at the discharge portion 56 at the lower end of the housing 36 without biasing influence from the resilient pad.

In the disclosed embodiment of the invention, the ramp is a trough of gradually increasing width and depth with sloping sidewalls 86, 87 which have edges 91, 92 at the sealing surface 51 of the pad 52 diverging in the direction of rotation of the disk. The sloping walls 86, 81 converge at their lower ends to form the rounded bottom or central part 68 of the ramp 66 which aligns with the path of the seed pockets 47. The sloping sidewalls 86, 87 are disposed to guide the kernel from the pocket as the pocket moves over the ramp 66. Thus, each pocket discharges its seed by gravity at the same point at the trailing edge of the pad 52. In the illustrated embodiment of the invention, the length of the ramp 66 in the direction of rotation of the disk 33 is equal to the distance between circumferentially adjacent seed pockets 47.

As is apparent to those familiar with the art to which this invention pertains, an improved air planter has been provided. Specifically, the air planter using this invention provides more uniform spacing of seed. As is well-known among agricultural production people, the proper spacing of plants improves crop yields because each plant is afforded proper space for root growth, sunlight and nourishment from the soil.

The embodiments of the invention in which an exclusive property or privilege is claimed are defined as follows:

1. An air planter of the type having a housing with a seed cavity to which bulk seed and pressurized air are supplied and a seed drop portion at the lower part thereof and a vertical seed singulating disk rotatable about a horizontal axis having a generally flat sealing face presenting circumferentially spaced seed pockets which sequentially communicate with said seed cavity and said seed drop portion when said disk is rotated in a predetermined direction, characterized by a resilient air cut-off pad of predetermined thickness in the direction parallel to the axis of said disk, said pad being interposed between said housing and disk with a trailing edge adjacent said seed drop portion, a flat sealing surface on said pad in resilient sealing engagement with the flat face of said disk whereby said seed pockets are brought into confronting relation with said sealing surface of said pad as said disk is rotated in said predetermined direction, and an area of gradually decreasing thickness in said pad beginning at said sealing surface, extending in said predetermined direction a predetermined distance and terminating at said trailing edge, said area of decreasing thickness being disposed to confront said seed pockets as said disk is rotated in said predetermined direction whereby the seeds in said pockets are substantially relieved of pressure of contact with said resilient pad as each pocket passes across said area of decreased thickness and across said trailing edge to said seed drop portion of said housing.

2. The air planter of claim 1 wherein said predetermined distance is substantially equal to the circumferential distance between circumferentially adjacent pockets.

3. A resilient air cut-off pad for an air planter of the type having a housing with a seed cavity to which bulk seed and pressurized air are supplied and a seed drop portion at the lower part thereof and a vertical seed singulating disk rotatable about a horizontal axis in a predetermined direction having a generally flat sealing face presenting circumferentially spaced seed pockets which move in a circular path to sequentially communicate with the seed cavity and seed drop portion during a planting operation, characterized in that said pad is adapted to be interposed between said housing and said disk with a trailing edge adjacent said seed drop portion, that said pad has a resilient body of predetermined thickness and a flat sealing surface on said body adapted for sealing engagement with the flat face of said disk whereby said seed pockets are brought into confronting relation with said sealing surface of said pad as said disk is rotated in said predetermined direction that said pad has an area of gradually decreasing thickness in said predetermined direction starting at said sealing surface and terminating at said trailing edge, and that said area of decreasing thickness of said pad, when installed in said planter, being disposed to confront said seed pockets as said disk is rotated in said predetermined direction whereby the seeds in said pockets are substantially relieved of pressure of contact with said resilient pad as each pocket passes across said area of decreased thickness and across said trailing edge to said seed drop portion of said housing.

* * * * *